R. STOCK.
PNEUMATIC TIRE.
APPLICATION FILED MAY 23, 1919.

1,395,614.

Patented Nov. 1, 1921.

Inventor:
Robert Stock
by attorneys

UNITED STATES PATENT OFFICE.

ROBERT STOCK, OF SANDUSKY, OHIO.

PNEUMATIC TIRE.

1,395,614.   Specification of Letters Patent.   Patented Nov. 1, 1921.

Application filed May 23, 1919. Serial No. 299,274.

*To all whom it may concern:*

Be it known that I, ROBERT STOCK, a citizen of the United States, and resident of Sandusky, in the county of Erie and State of Ohio, have invented a new and useful Improvement in Pneumatic Tires, of which the following is a specification.

The object of my invention is to produce a single tube pneumatic tire which is resilient, durable and adapted for use on both light and heavy vehicles.

A further object is to provide a tire of this character which can be quickly and conveniently made at a very moderate cost.

Figure 1:
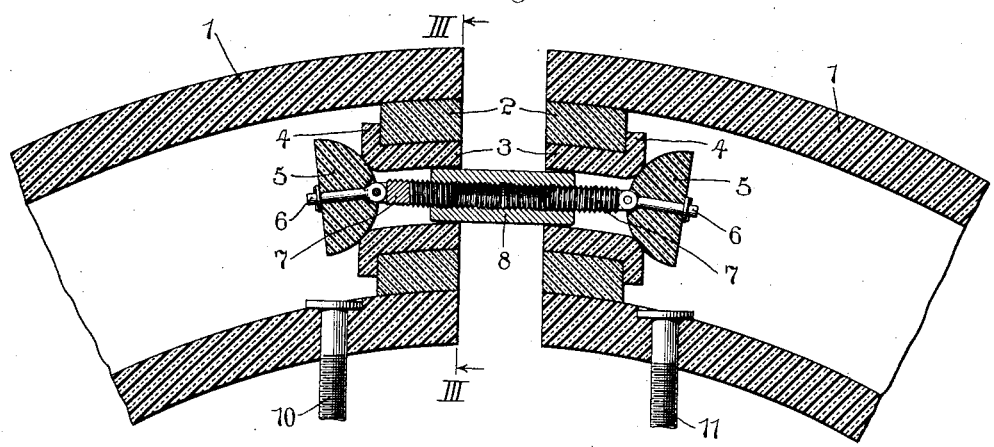
Figure 2:
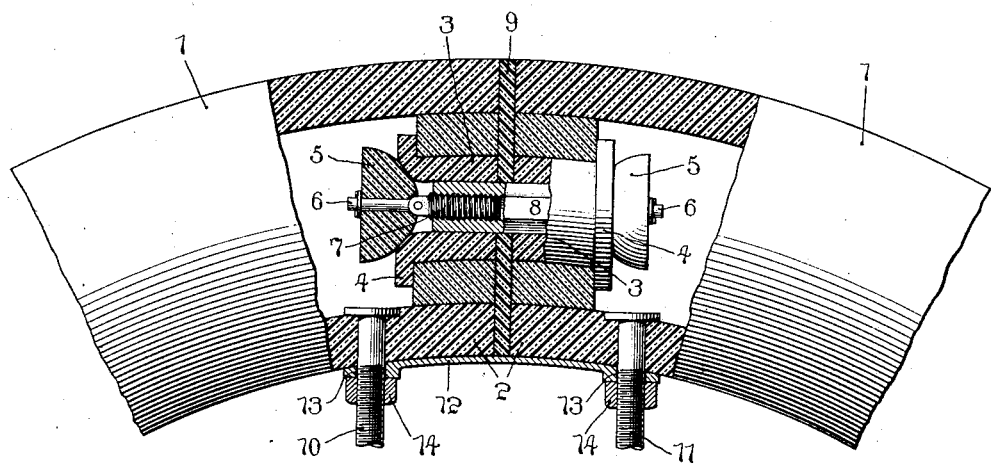
Figure 3:
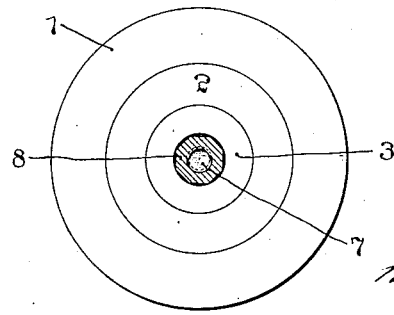

A practical embodiment of my invention is represented in the accompanying drawings in which, Figure 1 represents a vertical longitudinal section through the tire, showing the ends of the tire before they are drawn together, Fig. 2 represents a side elevation of the tire partly in section, showing the ends of the tire drawn together, and Fig. 3 represents a section taken on the line III—III of Fig. 1, looking in the direction of the arrows.

The hollow vulcanized rubber tube 1, which forms the tire, is made up of the usual rubber and fabric stock. Inside of each end of the tube 1 is an annular abutment 2, which is firmly attached to the inner walls of the tube by rubber cement or in any other convenient way. This abutment is formed of rubber and fabric vulcanized to a considerable degree of hardness. An annular soft rubber ring 3 having a flange 4, is located within the annular abutment 2 with its flange 4 resting on the inner lateral face of the abutment.

Stoppers 5, which are composed of vulcanized rubber and fabric or other suitable material and are substantially hemispherical in shape, are employed to seal the ends of the tube 1. Passing through each stopper 5, and attached to its flat face, is a pin 6 to the free end of which is swiveled the screw bolt 7. These screw bolts 7 coact with a right and left internally screw-threaded nut 8 so that when the nut is turned in one direction, the bolts will be drawn toward each other and the stoppers 5 pulled against the rings 3 to seal the ends of the tube against the passage of air. Further tightening of the nut will draw the ends of the tube 1 together, the nut being of such size that its ends will enter the bores of the rings 3 as the ends of the tube approach each other. When the ends of the tube have been brought so close together that a turning tool can no longer be operated between them to turn the nut, then the opening left between the ends is filled by inserting a split rubber ring 9 which completely fills the space and is held in place by rubber cement or in any other suitable manner.

The tube 1 is provided with an exteriorly screw-threaded air valve 10 near one of its ends and a similar dummy valve or pin 11 near its other end. The valve 10 and the pin 11 are adapted to enter holes in the rim, not shown herein, and serve to properly locate the tire on the rim and aid in preventing any creeping on the rim.

To assist in holding the ends of the tube together, a thin metallic plate 12 having openings 13 to receive the valve 10 and the pin 11, may be placed on the inner periphery of the tire to span the ends of the tube and may be fastened securely thereto by nuts 14 operating on the said valve and pin.

It will be seen that the pneumatic tire of this invention has a double air seal.

The tube 1 from which the tire is formed may be made up and vulcanized on a straight or spiral cylindrical mandrel and then cut into the lengths necessary for the various sized tires.

Tire tubing made in this manner will be equally strong and durable throughout and can be produced at a great saving of time and expense in making up and vulcanizing.

It is evident that various changes may be resorted to in the form, construction and arrangement of the several parts without departing from the spirit and scope of my invention, and hence I do not intend to limit myself to the details herein shown and described except as they may be specifically included in the claims.

What I claim is:

1. A transversely divided pneumatic tire and means engaging each end of the tire for sealing it and moving the ends longitudinally.

2. A transversely divided pneumatic tire, means engaging each end of the tire for sealing it and means intermediate the ends coacting with the aforesaid means for controlling the longitudinal movement of the ends.

3. A transversely divided pneumatic tire, means for sealing and drawing together the adjacent ends of the tire comprising an oppositely screw-threaded nut, screw bars coacting with said nut, pins swiveled to said bars and stoppers carried by said pins.

4. A transversely divided pneumatic tire having an annular abutment fixed in each end of the tire, a soft rubber ring in contact with each of said abutments, a stopper in each end of the tire and means for bringing each stopper into tight engagement with its respective ring to seal and draw together the ends of the tire.

5. A transversely divided pneumatic tire having an annular abutment fixed in each end of the tire, a soft rubber ring in contact with each of said abutments, a stopper in each end of the tire and common means for bringing each stopper into tight engagement with its respective ring to seal and draw together the ends of the tire.

6. A transversely divided pneumatic tire having an annular abutment fixed in each end of the tire, means for drawing the ends together including stoppers, and soft rubber rings interposed between the stoppers and the abutments.

In testimony that I claim the foregoing as my invention, I have signed my name this 25th day of June, 1917.

ROBERT STOCK.